United States Patent
Ke

(10) Patent No.: US 10,503,392 B2
(45) Date of Patent: Dec. 10, 2019

(54) USER INTERFACE ADJUSTMENT METHODS AND SYSTEMS

(71) Applicant: Yahoo!, Inc., Sunnyvale, CA (US)

(72) Inventor: Tony Ke, New York, NY (US)

(73) Assignee: Oath Inc., New York, NY (US)

(*) Notice: Subject to any disclaimer, the term of this patent is extended or adjusted under 35 U.S.C. 154(b) by 295 days.

(21) Appl. No.: 14/749,799

(22) Filed: Jun. 25, 2015

(65) Prior Publication Data

US 2016/0378286 A1    Dec. 29, 2016

(51) Int. Cl.
*G06F 3/048* (2013.01)
*G06F 3/0488* (2013.01)
*G06F 3/01* (2006.01)

(52) U.S. Cl.
CPC .......... *G06F 3/04883* (2013.01); *G06F 3/017* (2013.01); *G06F 3/04886* (2013.01)

(58) Field of Classification Search
CPC ... G06F 3/017; G06F 3/04883; G06F 3/04886
See application file for complete search history.

(56) References Cited

U.S. PATENT DOCUMENTS

| | | | |
|---|---|---|---|
| 8,760,426 B1 | 6/2014 | Strand et al. | |
| 2006/0022955 A1* | 2/2006 | Kennedy | G06F 3/0414 345/173 |
| 2008/0052945 A1* | 3/2008 | Matas | G06F 3/0485 34/173 |
| 2008/0165255 A1* | 7/2008 | Christie | G06F 3/04883 348/207.99 |
| 2011/0018827 A1* | 1/2011 | Wang | G06F 3/0482 345/173 |
| 2013/0307783 A1* | 11/2013 | Park | G06F 3/04886 345/169 |
| 2014/0111451 A1* | 4/2014 | Park | G06F 3/04883 345/173 |
| 2017/0025097 A1* | 1/2017 | Kuribayashi | G06F 3/147 |

* cited by examiner

*Primary Examiner* — Thanh T Vu
(74) *Attorney, Agent, or Firm* — Cooper Legal Group, LLC

(57) ABSTRACT

One or more systems and/or methods for adjusting a user interface based upon an orientation of an input object are provided. An input provided by an input object (e.g., a hand of the user) may be received through a display of a device (e.g., a touchscreen display of a smartphone). The input may comprises gesture data corresponding to a gesture performed relative to the display. The input may be evaluated to determine an orientation, such as a hand orientation, of the input object. In an example, curvature associated with the gesture may be evaluated to determine the orientation of the input object. A user interface displayed by the device may be adjusted based upon the orientation of the input object. In an example, a location, a size, an appearance, an output, and/or a functionality of a user interface element displayed within the user interface may be adjusted.

20 Claims, 16 Drawing Sheets

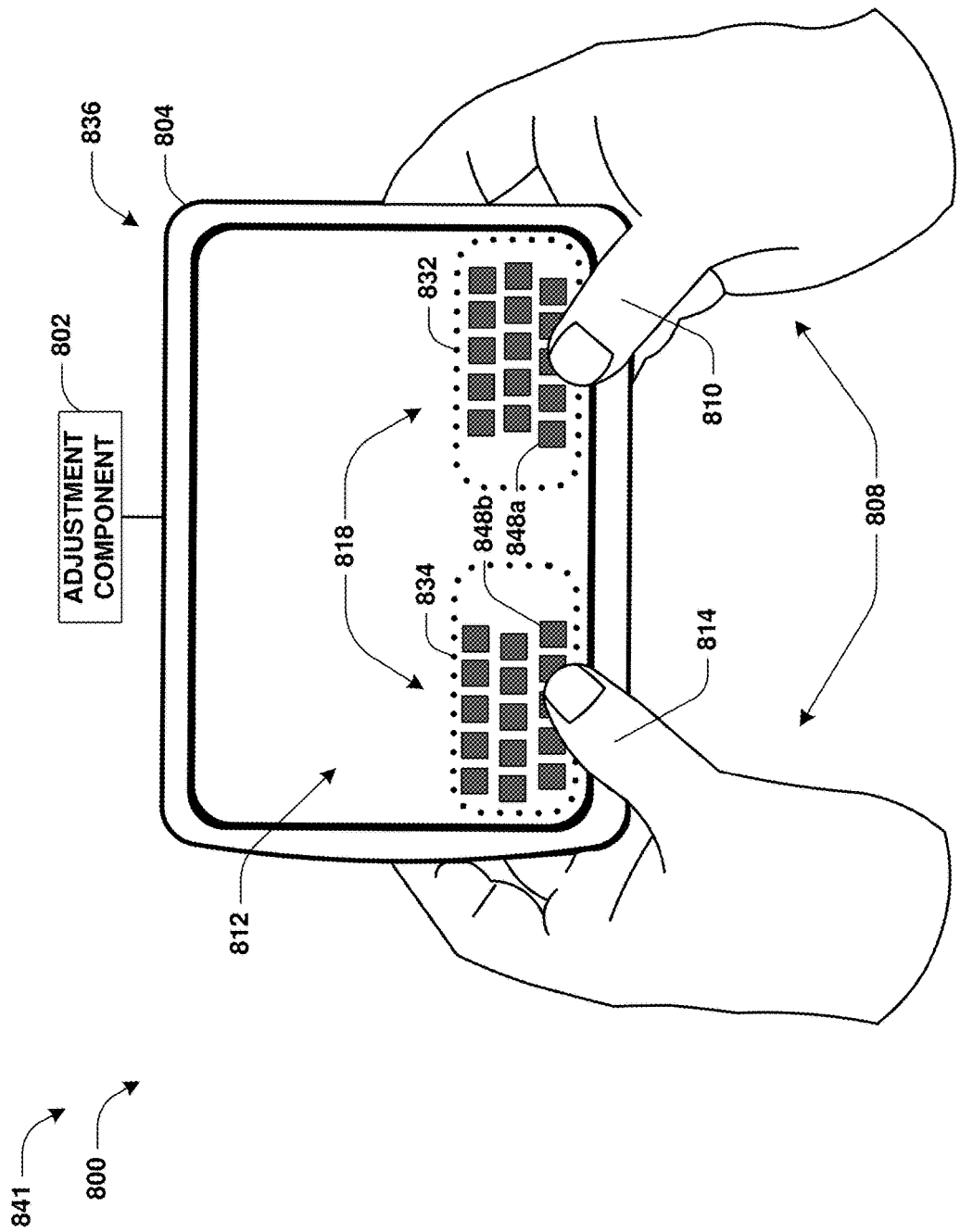

USER INTERFACE ADJUSTMENT METHODS AND SYSTEMS

BACKGROUND

Many users may own and/or interact with computing devices on a regular basis. In an example, a user may read an electronic book on a tablet. In another example, the user may navigate to a new location using a map application on a smartphone. Users may even interact with computing devices while performing other tasks/activities (e.g., a user may interact with a mobile device while walking, playing a game, working on a car, shopping, etc.). As such, users may utilize various hand orientations (e.g., right handed grips, left handed grips, one handed grips, etc.) to interact with a computing device throughout a day, such as holding the smartphone with a one handed grip (e.g., the smartphone maybe gripped between the thumb and forefinger of the user), a cradling grip (e.g., one hand may be used to hold the smartphone and another hand may be used to interact with the a display of the smartphone), a two-handed grip (e.g., the smartphone may be gripped between the thumb and forefinger of the right hand and the left hand of the user), etc. Based upon the hand orientation utilized by the user, various portions of a display of the computing device may be more or less accessible to the user (e.g., the user may only be able to access a lower right portion of the display based upon holding the device in his right hand and utilizing a one handed grip). As such, users may be required to adjust their grip in order to access user interface elements that are not located within a conveniently accessible portion of the display and/or may inadvertently contact other user interface elements as a result of attempting to over extend to access a particular user interface element. Unfortunately, many computing devices may lack technology that can determine the hand orientation of a user, which may result in ineffective utilization of the user interface of the computing device (e.g., a notification may be displayed on a portion of the display that cannot be accessed by the user without changing his current hand orientation).

SUMMARY

In accordance with the present disclosure, one or more systems and/or methods for adjusting a user interface based upon an orientation of an input object (e.g., hand, finger, stylus, etc.) are provided. An input provided by an input object associated with a user may be received, such as through a display of a device (e.g., smartphone, tablet, television, virtual wall, etc.). In an example, the display may comprise a touchscreen display (e.g., capacitive touchscreen) or a motion sensing display. In another example, the input may comprises gesture data corresponding to a gesture (e.g., swipe gesture, pan gesture, etc.) performed by the user relative (e.g., on and/or in a line-of-sight) to the touchscreen display or the motion sensing display. In an example, the gesture may comprise at least one of a single touch gesture, a multi-touch gesture, or a hands-off gesture (e.g., a gesture performed through the air relative to a motion sensing display). In an example, the input object may comprise a hand (e.g., finger) of the user. The input may be evaluated to determine an orientation (e.g., hand orientation, arm orientation, etc.) of the input object associated with the user. In an example, curvature associated with the gesture may be evaluated to determine the orientation of the input object. In an example, the gesture may be evaluated to identifying at least one of right focused curvature or left focused curvature.

In an example, responsive to identifying right focused curvature, a determination may be made that the user has a right hand orientation. In another example, responsive to identifying left focused curvature, a determination may be made that the user has a left hand orientation.

A user interface, displayed by the device, may be adjusted based upon the orientation of the input object. In an example, at least one of a location, a size, an appearance, an output, or a functionality of a user interface element displayed within the user interface may be adjusted. In an example, the user interface may be adjusted based upon the orientation of the input object and a primary accessibility area of the user interface (e.g., a portion of the user interface that may be easily accessible to the user based upon a current user grip of the device). In an example, the primary accessibility area may be determined based upon at least one of a hand size, a finger length, an arm length, a leg length, a hand orientation, an arm orientation, a leg orientation, or a grip associated with the hand orientation.

In an example, the input may be evaluated to determine an emotional state of the user and the user interface may be adjusted based upon the emotional state of the user (e.g., a user pressing hard on a touchscreen display may be indicative of the user being angry, a user performing a swipe gesture multiple times over a short period may be indicative of the user being frustrated, etc.). In an example, a force of the gesture may be evaluated to determine the emotional state of the user. In another example, a frequency of a set of gestures may be evaluated to determine the emotional state of the user.

In an example, calibration data may be generated for a particular orientation of the input object (e.g., calibration data may be generated for a bottom right one-handed grip utilized to hold a smartphone). The calibration data for the particular grip may be compared to the gesture data. Responsive to the calibration data corresponding to the gesture data, the orientation of the input object may be determined to correspond to the particular orientation. In an example, the calibration data may be generated by instructing the user to hold the device with a particular grip and perform a calibration gesture utilizing the particular grip to generate the calibration data. The calibration data may be evaluated to determine curvature associated with the calibration gesture.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 8D is a component block diagram illustrating an example system for adjusting a user interface, wherein a virtual keyboard user interface element is adjusted based upon a first primary accessibility area and a second primary accessibility area.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
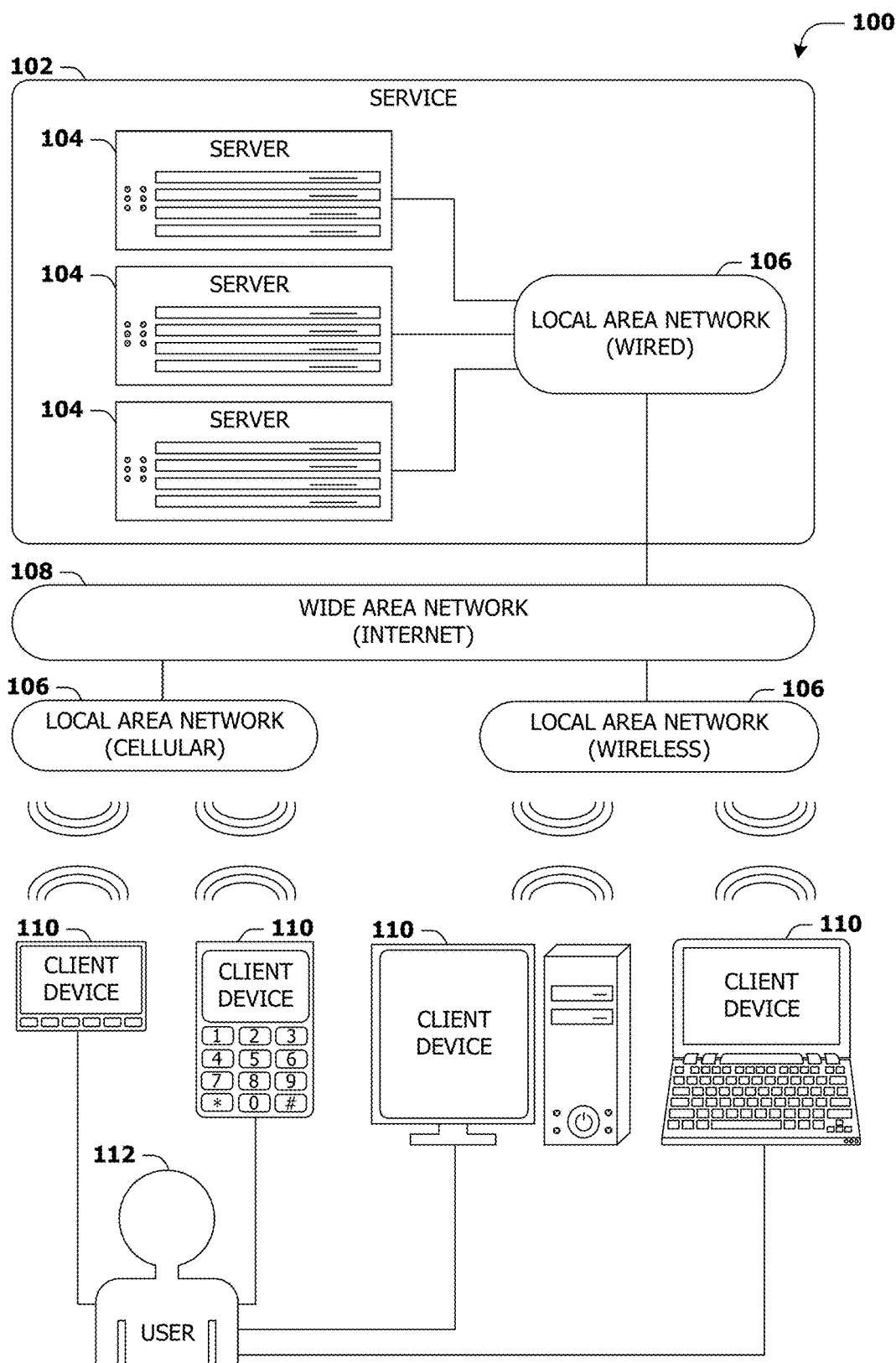
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
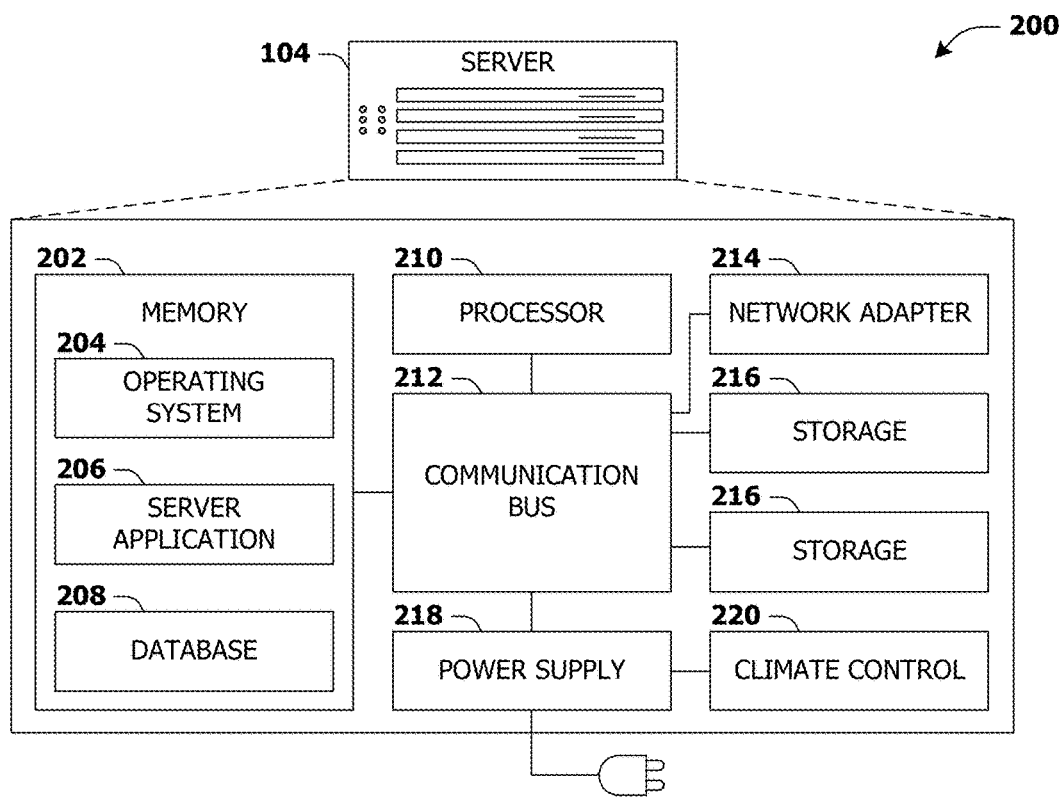
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
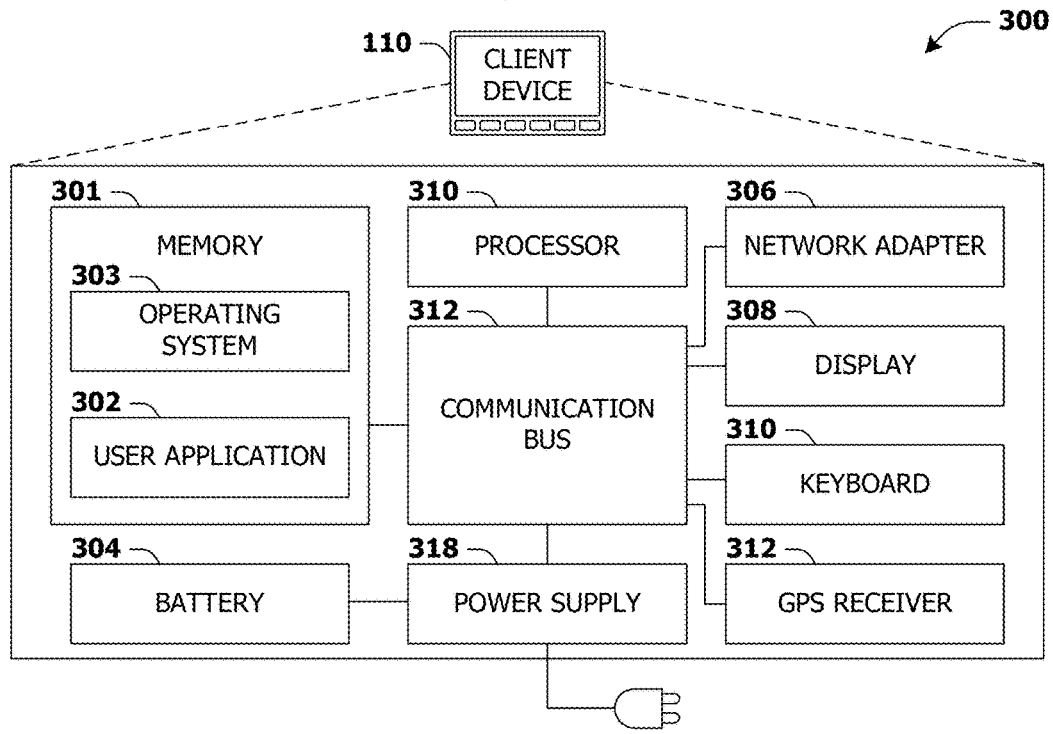
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for adjusting a user interface are provided. Many devices lack detection techniques and/or functionality for determining an orientation of an input object (e.g., a finger, a hand, an arm, etc.) utilized by a user to interact with a device and/or the ability to adjust a user interface displayed by the device based upon the orientation of the input object. As provided herein, an input provided by an input object (e.g., hand, arm, stylus, etc.) associated with a user may be received, such as through a display (e.g., touchscreen display, motion sensing display, etc.) of a device (e.g., smartphone, tablet, television, virtual wall, etc.). In an example, the input may comprises gesture data corresponding to a gesture (e.g., swipe gesture, pan gesture, etc.) performed relative (e.g., on and/or in a line-of-sight) to the display. The input may be evaluated to determine the orientation (e.g., hand orientation, arm orientation, etc.) of the input object. In an example, curvature associated with the gesture may be evaluated to determine the orientation of the input object. A user interface displayed by the device may be adjusted based upon the orientation of the input object. In an example, at least one of a location, a size, an appearance, an output, or a functionality of a user interface element displayed within the user interface may be adjusted.

The orientation of the input object may be identified through the utilization of displays present in many devices, such as touchscreen displays and/or motion sensing displays. Thus, existing sensors, without the inclusion of additional sensors, may be used, which may reduce manufacturing costs (e.g., a cost of additional sensors and/or incorporating the additional sensors into the device), design limitations (e.g., space limitations associated with a layout of the device), and/or power consumption associated with operating additional sensors. A user's experience with a user interface as well as an operating efficiency of the user may be enhanced by adjusting the user interface based upon the orientation of the input object (e.g., a user interface element may be relocated to be within an easily assessable area of the user interface for a particular hand orientation, thus reducing the need for a user to adjust a grip on a device and/or minimizing unintentional interactions with other user interface elements). In an example, a user interface element utilized by the user more often than other user interface elements may be positioned in a primary accessibility area for a given orientation of the input object so that the user interface element may be more readily and easily accessed by the user. In another example, a directionality of a user interface element may be adjusted based upon whether the user is right handed or left handed. Accordingly, the operating efficiency, functionality, and/or power consumption of devices may be improved (e.g., increased precision/accuracy of user input and interaction with a user interface, decreased user fatigue, increased grip stability, a reduced likelihood the user will drop the device, etc.).

Figure 4:
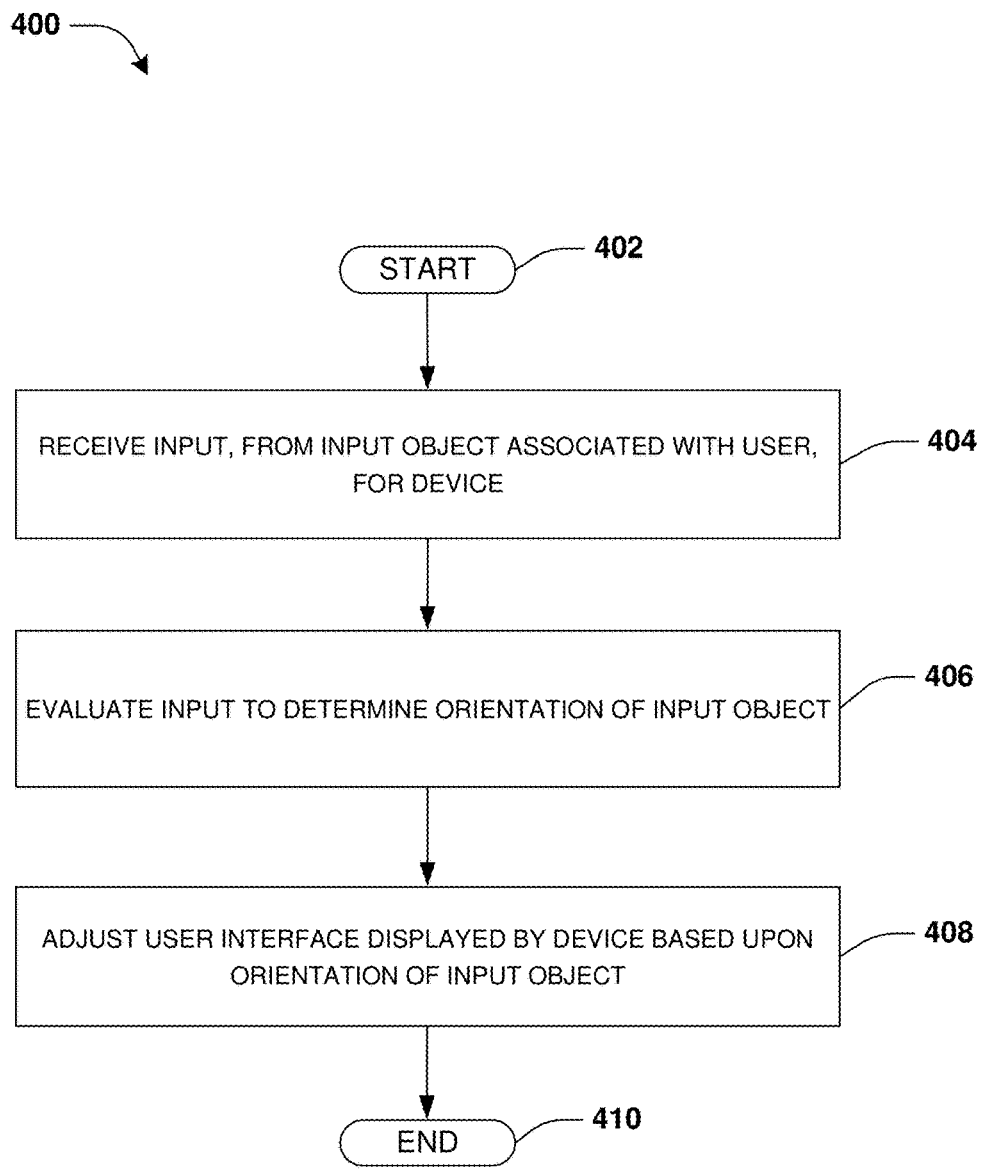
FIG. 4 is a flow chart illustrating an example method of adjusting a user interface.

An embodiment of adjusting a user interface is illustrated by an example method 400 of FIG. 4. At 402, the method 400 starts. At 404, an input may be received from a user. In an example, the input may be received through a device. The device may comprise a game console (e.g., video game consoles, casino game consoles such as slot machines, video poker consoles, etc.), a personal computer, a laptop, a monitor, a tablet, a smartphone, a smart watch, a personal digital assistant, a global position system (GPS) navigation device, a vehicle information component (e.g., a vehicle display console for accessing other components, such as a navigation system, a DVD player, a radio tuner, etc.), a smart television, a kiosk, a smart board, a smart wall (e.g., multi-touch multi-user smart walls), a vehicle interface component (e.g., an in-dash component for controlling temperature, radio, navigation, etc. for a vehicle), or the like.

In an example, the input may be received though a display associated with the device, such as a touchscreen display or a motion sensing display. The touchscreen display may comprise a resistive touchscreen display (e.g., 5-wire resistive touchscreen), a surface acoustic wave touchscreen display (e.g., touchscreen with a series of piezoelectric transducers and receivers along sides of a display), a capacitive sensing touchscreen display (e.g., an insulator, such as glass coated with a transparent conductor such as indium tin oxide, etc.), a surface capacitance touchscreen display, a projected capacitance touchscreen display, a mutual capacitance touchscreen display, a self-capacitance touchscreen display, an infrared touchscreen display, an optical touchscreen display, or an acoustic pulse touchscreen display. The motion sensing display may comprise an interactive projection display configured to project a user interface onto a surface (e.g., a wall, a floor, a table, a body part, etc.) and/or a motion sensing input device, such as a line-of-motion input sensor, configured to receive the input from the user. In an example, the display may comprise a projector (e.g., a pico-projector, an overhead projector, a liquid crystal display projector, etc.) and one or more sensors configured to detect a hands-off gesture performed by the user (e.g., a virtual representation of a user interface may be projected directly onto the skin of the user and responsive to the user performing a gesture relative to the virtual representation, a proximity sensor may receive an input corresponding to the gesture). In another example, a range camera having an infrared projector may be utilized to detect hands-off gestures performed by the user. For example, the motion sensing display may be configured as an interactive window display (e.g., an interactive storefront window display, an interactive vehicle window display, etc.), an immersive interactive display, and/or a 3D tracking display (e.g., 3D hand-tracking display, 3D body-tracking display, etc.).

In an example, the input may be provided by an input object associated with the user. The input object may comprise a finger of the user, a hand of the user, an arm of the user, a leg of the user, a stylus held by the user, a controller held and/or worn by the user, etc. In an example, the input may correspond to a gesture performed by the user with the input object (e.g., the user may perform the gesture on the touchscreen display of a smartphone with a thumb). The gesture may comprise a single touch gesture (e.g., gestures performed with one finger, a stylus, etc.), a multi-touch gesture (e.g., gestures performed with two or more fingers and/or with two or more points of contact), and/or a hands-off gesture (e.g., a gesture performed without contacting a surface of the display). In an example, the single touch gesture may comprise a vertical swipe gesture, a horizontal swipe gesture, a pan gesture, a handwriting gesture (e.g., writing on a touchscreen with a stylus), or the like. In another example, the multi-touch gesture may comprise a pinch gesture (e.g., a two-finger pinch gesture, a thumb and three-finger pinch gesture, etc.), a zoom gesture, a rotational gesture, a multi-finger vertical swipe gesture, or the like. In yet another example, the hands-off gesture may comprise a gesture performed by the user through the air (e.g., a push gesture, a wave gesture, a punch gesture, swipe gesture, a kick gesture, etc.).

In an example, responsive to the user performing the gesture, gesture data corresponding to the gesture may be generated. The gesture data may comprise electrical impulse data and/or coordinate mapping data corresponding to the gesture and/or points on the display where the gesture was performed (e.g., the electrical impulses and/or coordinates may correspond to a location, a shape, a size, a force, etc. of the gesture). For example, gesture data may be generated by the touchscreen display in response to the user performing a horizontal swipe gesture with a thumb on the touchscreen display. The gesture data for the horizontal swipe gesture may comprise data associated with the force utilized by the user to perform the gesture and/or the points on the touchscreen display corresponding to where the horizontal swipe gesture was performed.

At 406, the input may be evaluated to determine an orientation of the input object (e.g., a right-hand orientation, a left-hand orientation, a right-arm orientation, a left-leg orientation, etc.). The orientation of the input object may be determined by evaluating one or more characteristics of the gesture, such as a curvature, a length, a speed, and/or a force of the gesture. In an example, where the input object is a hand and/or finger of the user, the orientation may comprise a hand orientation of the user.

In an example, the curvature of the gesture may be evaluated to determine the hand orientation of the user (e.g., the curvature may indicate that the device was held with a one-handed grip in the left hand of the user when the gesture was performed). For example, the gesture may contain curvature as a result of the natural constraint of the circular range of motion of the thumb associated with a particular hand of the user (e.g., the curvature may indicate whether the gesture was performed with the left hand or the right hand of the user). Thus, the curvature of the gesture may correspond to the hand utilized by the user to perform the gesture. In an example, a horizontal swipe gesture may comprise right focused curvature in response to the horizontal swipe gesture being performed by the thumb associated with the right hand of the user. Responsive to identifying the right focused curvature of the horizontal swipe gesture, the hand orientation of the user may be identified as a right-handed orientation. In another example, curvature of a handwriting gesture may be evaluated to determine the hand orientation of the user (e.g., an angle of the handwriting gesture and/or a slant of the handwriting gesture may be indicative of the hand utilized by the user to perform the handwriting gesture). In yet another example, curvature of a hands-off push gesture performed by the right arm of the user may be evaluated to determine an arm orientation utilized by the user to perform the hands-off push gesture (e.g., curvature generated as a result of the natural constraint of the range-of-motion of the arm may be evaluated to determine if the hands-off push gesture was performed with the left arm and/or the right arm of the user) and/or based upon visual features recognized from imagery captured of the user performing the hands-off push gesture.

In an example of determining the hand orientation of the user, the grip utilized by the user to hold the device may be identified. The grip may comprise a one-handed grip (e.g., the device maybe gripped between the thumb and forefinger of the user), a cradling grip (e.g., using two hands to hold the device but only one hand to perform the gesture), or a two-handed grip (e.g., the device may be gripped between the thumb and forefinger of the right hand and the left hand of the user). In an example, the grip may be identified based upon the location of the gesture, a hand size of the user, and/or other characteristics of the gesture (e.g., curvature, length, etc.). For example, the curvature of the gesture, the location of the gesture, and the hand size of the user may be evaluated to determine the grip utilized by the user to hold the device (e.g., a first swipe gesture performed from a cradle grip may have less curvature than a second swipe gesture performed from a one-handed grip; a horizontal swipe performed at the bottom of a display may indicate a low placed grip, a long vertical swipe gesture may indicate a cradle grip, etc.).

In an example, the hand size of the user may be determined by evaluating the gesture. For example, the length of the gesture and/or the grip may be analyzed to determine the hand size of the user. In an example, a hand size multiplier may be utilized to determine a length of one or more fingers of the user based upon the length of the gesture and the grip (e.g., a vertical swipe gesture having a length of 1.0 inch may be multiplied by a thumb multiplier of 1.8 to determine that the thumb of the user has a length of about 1.8 inches). Once the length of a first finger is determined, a finger-to-finger multiplier may be utilized to determine the length of a second finger of the user (e.g., responsive to determining the length of the thumb, a thumb-to-index finger multiplier may be utilized to determine the length of an index finger of the user). In this way, finger lengths for various fingers of the user may be determined and subsequently utilized in the event the user adjusts his grip from a first grip to a second grip.

In an example, calibration data may be utilized to determine the orientation of the input object. In an example, the calibration data corresponding to various hand orientations may be generated in response to the user performing one or more calibration gestures with various particular grips. For example, the user may be instructed to grip the device with a particular grip (e.g., holding a tablet with a left-one-handed grip) and perform a calibration gesture (e.g., vertical swipe gesture) to generate calibration data corresponding to the particular grip (e.g., the user may be instructed to perform the vertical swipe gesture while holding the device with the left-one-handed grip). The calibration data may be evaluated to determine curvature of the calibration gesture performed with the particular grip. Subsequently, the hand orientation utilized by the user to perform the gesture may be determined by comparing gesture data for the gesture to the calibration data for the calibration gesture. For example, responsive to the curvature of the calibration gesture corresponding to the curvature of the gesture, the grip utilized by the user to perform the gesture may be identified as the particular grip. Put differently, gesture data for a vertical swipe gesture may be compared to calibration gesture data for a vertical swipe calibration gesture associated with a right-handed orientation (e.g., calibration gesture data for gesture length, gesture force, and/or gesture curvature may be compared to gesture data for the vertical swipe gesture). Responsive to the gesture data for the vertical swipe gesture corresponding to the calibration gesture data for the vertical swipe calibration gesture, the hand orientation of the user may be determined to be right-handed orientation. In an example, utilizing calibration data to identify the hand orientation (e.g., grip) of the user may increase the accuracy and/or the efficiency of identifying the hand orientation of the user.

At 408, a user interface displayed by the device may be adjusted based upon the hand orientation of the user. In an example of adjusting the user interface, a location, a size, an appearance, an output, and/or a functionality of a user interface element displayed within the user interface may be adjusted (e.g., a slider, a scroll bar, an icon, a message box, a notification, a modal window, a button, a toggle, etc. for an application may be adjusted to accommodate a left-handed orientation). In an example, the user interface element may be adjusted based upon a primary accessibility area of the user interface (e.g., a portion of the display that may be conveniently and/or efficiently accessed, such as without adjusting a grip on the device, by the user for a given hand orientation of the user). The primary accessibility area may comprise one or more sub-areas having varying levels of access. For example, a first sub-area proximate a lower left portion of the display may have a first level of access and a second sub-area proximate the lower middle portion of the display may have a second level of access. The second level of access may be greater than the first level of access based upon the user being able to interact with the second sub-area more efficiently than the first sub-area (e.g., the user may need to bend his thumb in order to interact with content within the first sub-area and/or the first sub-area may be at an outer boundary of the proximity area).

The primary accessibility area may be identified based upon at least one of the grip on the device, the hand size of the user (e.g., finger length, etc.), and/or other characteristics of the gesture. In an example, the primary accessibility area may comprise an area accessible to the user based upon the grip on the device and the finger length for the user (e.g., a maximum reachable area for a given hand orientation). For example, the primary accessibility area may comprise a lower right portion of the display based upon the user utilizing a low placed right-one-handed grip to hold the device (e.g., the user may hold the device proximate a bottom part of the device with his right hand, and may utilize a thumb to interact with the user interface). In another example, the primary accessibility area may be identified based upon the calibration data. For example, various calibration gestures performed with the hand orientation utilized by the user may be evaluated to determine a cross sectional area where various calibration gestures overlap and/or a maximum reachable area (e.g., the user may be instructed to perform predetermined gestures in such a way that a maximum range for the particular grip may be determined for the user).

In an example of adjusting the user interface, a first user interface element located outside of the primary accessibility area may be relocated within the primary accessibility area. For example, an email application icon user interface element may be relocated, such that the user may interact with the email application icon without needing to adjust his hand orientation (e.g., grip). In another example, a sports application icon user interface element and a social media user interface element may be relocated based upon a rate of interaction. For example, responsive to the social media application user interface element having a greater rate of interaction than the sports application user interface element (e.g., the user interact with the social media application user interface element more frequently than the sports application user interface element), the social media user interface element may be relocated within the first sub-area based upon the first sub-area having a higher level of access for the user than the second sub-area and the sports application user interface element may be relocated within the second sub-area.

In an example, the functionality of the user interface element may be adjusted based upon the hand orientation of the user. In this way, a user experience with the user interface (e.g., an application, an operating system, etc.) may be adjusted for various users regardless of the hand orientation for a particular user. For example, a developer may determine that users generally prefer to swipe a notification user interface element in a first direction to perform a first function (e.g., swiping an email notification away from their hands to delete an email message) and swipe the notification user interface element in a second direction to perform a second function (e.g., swiping an email notification towards their hands to launch an email application to respond to the email message). Thus, responsive to identifying a right-handed orientation, the functionality of the notification user interface element may be adjusted such that performing a swipe gesture to the left (e.g., swiping away from the hand of the user) deletes the email message and performing a swipe gesture to the right (e.g., swiping towards the hand of the user) launches the email application. In another example, responsive to identifying a left-handed orientation, the functionality of the notification user interface element may be adjusted such that performing the swipe gesture to the left (e.g., swiping towards the hand of the user) launches the email application and performing the swipe gesture to the right (e.g., swiping away from the hand of the user) deletes the email message. In an example, adjusting the functionality of user interface elements based upon the hand orientation of the user may increase the efficiency with which users utilize the user interface and/or enhances the user experience of users with the user interface (e.g., improve the rate and/or accuracy with which users can perform tasks, conform to known preference of users regardless of hand orientation, etc.).

In an example, an emotional state of the user may be determined based upon the input. The emotional state may correspond to a happy emotional state, a sad emotional state, a tired emotional state, a frustrated emotional state, an angry emotional state, a bored emotional state, etc. In an example, the force of the gesture may be evaluated to determine the emotional state of the user. For example, responsive to the force of the gesture exceeding a threshold amount, the user may be determined to be in the angry emotional state (e.g., the user pressing or tapping very hard on the display may indicate that the user is angry). In another example, the frequency with which the user performs one or more gestures may be evaluated to determine the emotion state of the user. For example, responsive to identifying that the user has performed one or more gestures rapidly during a short period of time, the emotional state of the user may be determined to be the frustrated emotional state (e.g., the user may rapidly scroll through an electronic publication on a tablet in response to being frustrated that a desired article cannot be locate within the electronic publication). In an example, the appearance of the user interface and/or user interface elements displayed within the user interface may be adjusted based upon the emotional state of the user. For example, responsive to determining that the emotional state of the user corresponds to the angry emotional state, a calming and/or tranquil color scheme may be applied to the user interface. In another example, responsive to determining that the emotional state of the user corresponds to the sad emotional state, a bright and/or happy color scheme may be applied to the user interface. In another example of adjusting the functionality of the user interface element, a type of content associated with the user interface element may be adjusted based upon the emotional state of the user. For example, responsive to determining that the emotional state of the user corresponds to the frustrated emotional state, a volume level functionality for an auditory alert associated with a notification user interface element may be lowered. In another example, responsive to identifying the angry emotional state for the user, war focused news articles (e.g., potentially upsetting news articles) may be filtered out of a news feed displayed within the user interface. In yet another example, responsive to determining that the emotional state of the user corresponds to the sad emotional state, a gaming application user interface element may be relocated into the primary accessibility area of the user interface. By adjusting the user interface based upon the emotional state of the user, the overall user experience of the user with the user interface may be improved.

At 412, the method 400 ends.

Figure 5A:
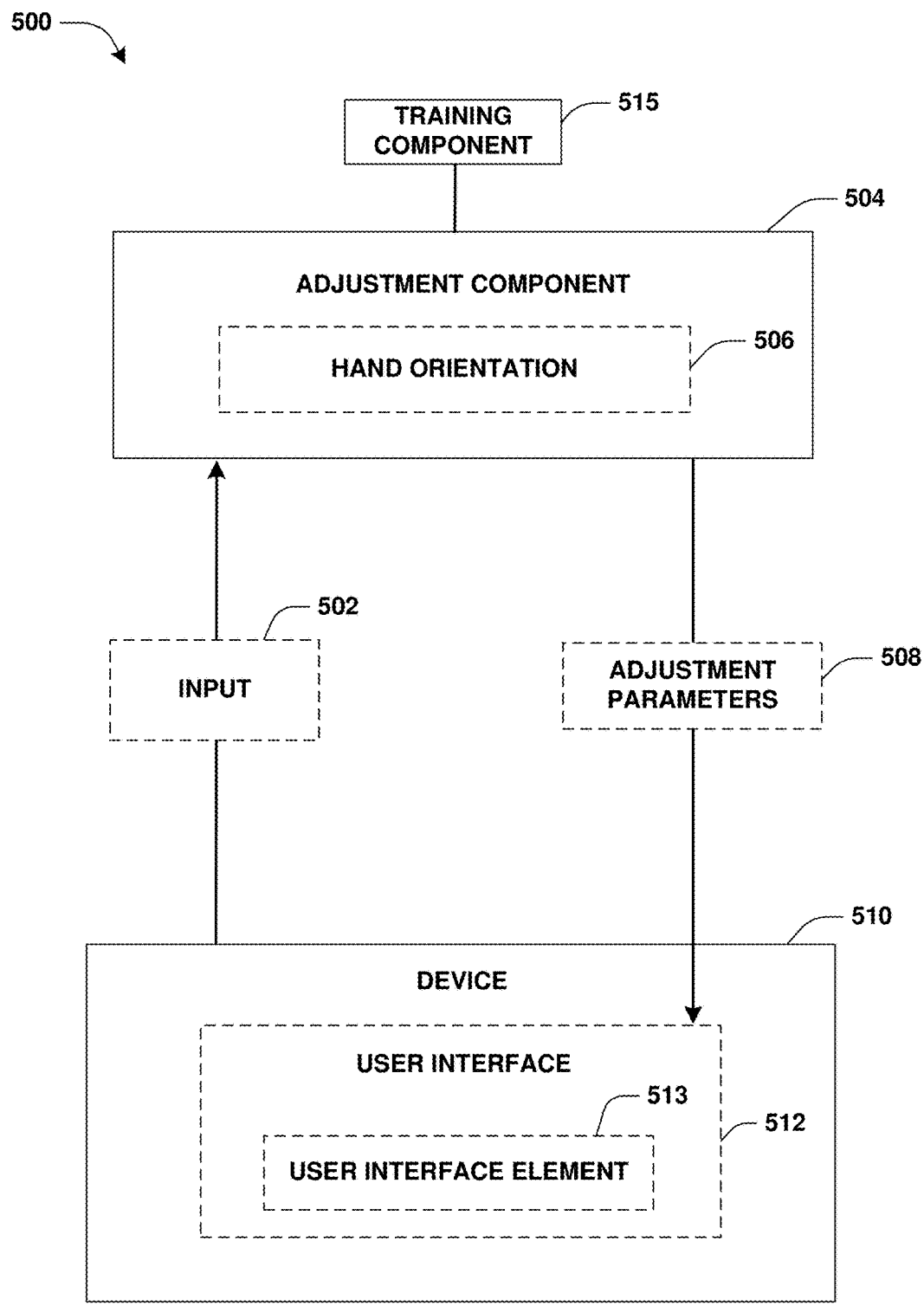
FIG. 5A is a component block diagram illustrating an example system for adjusting a user interface.
Figure 5B:
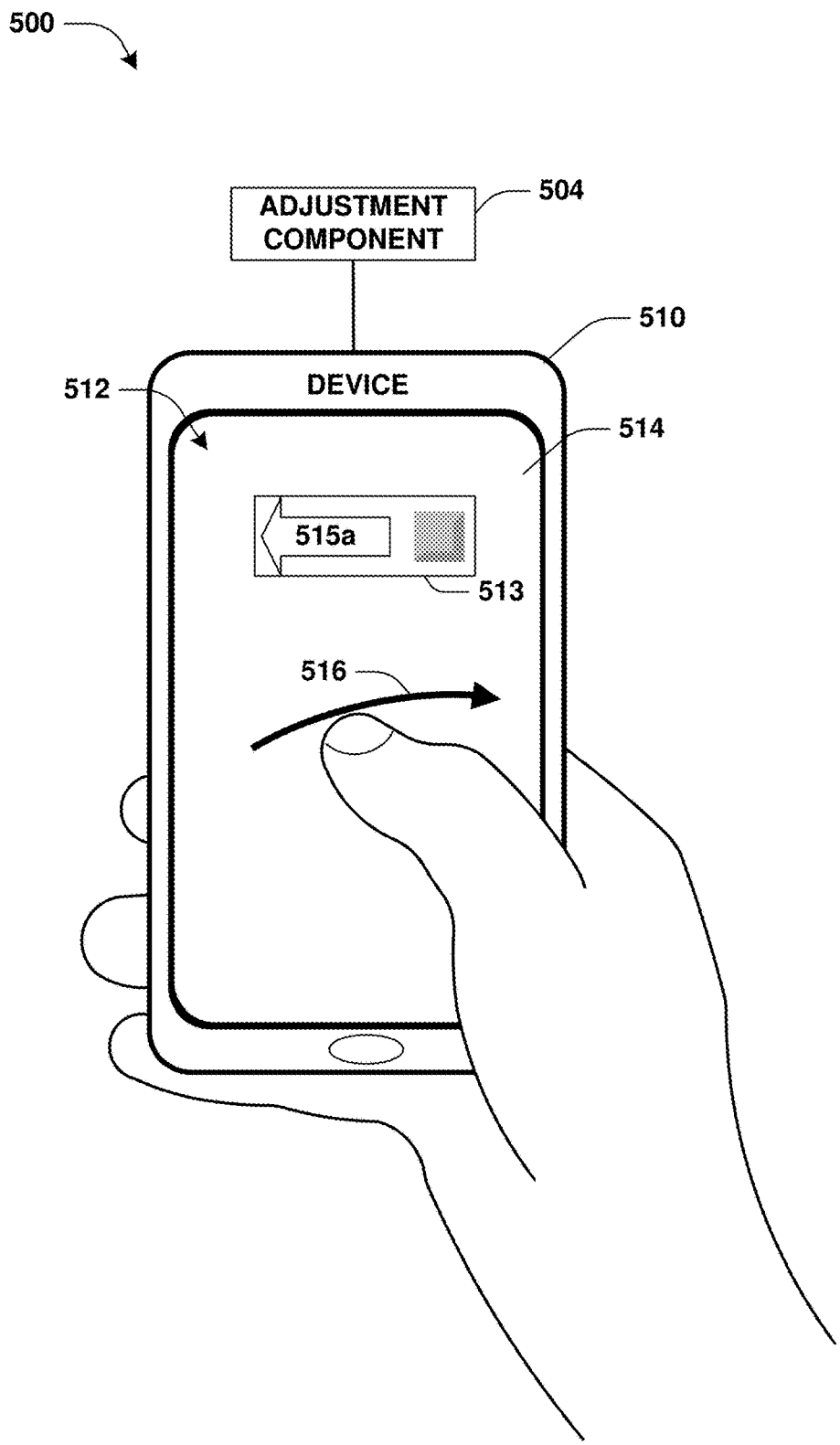
FIG. 5B is a component block diagram illustrating an example system for adjusting a user interface, wherein a gesture is received by an adjustment component.
Figure 5C:
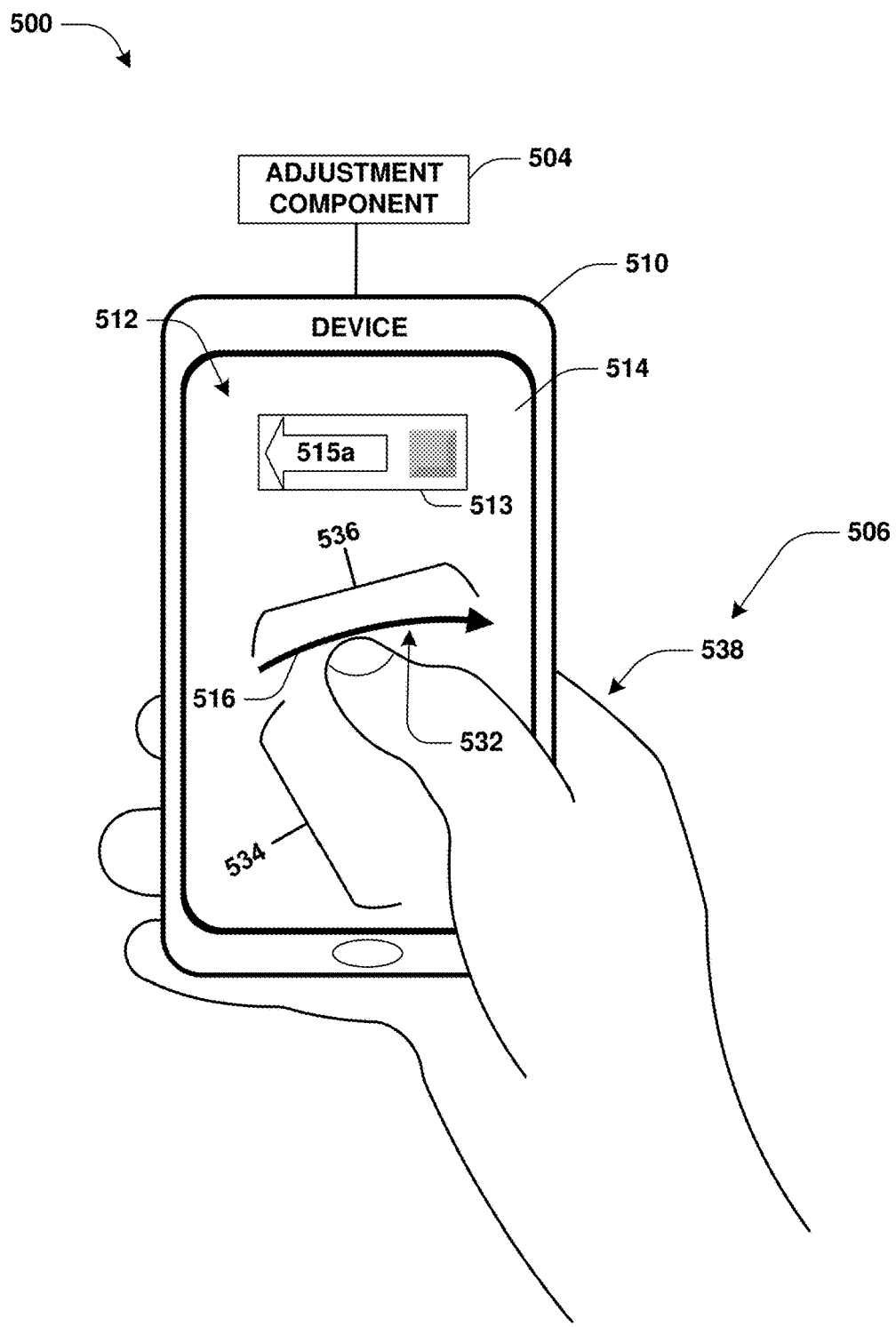
FIG. 5C is a component block diagram illustrating an example system for adjusting a user interface, wherein a gesture received by a device is evaluated.

FIGS. 5A-5D illustrate examples of a system 500, where an adjustment component 504 is configured to adjust a user interface 512 displayed by a device 510. Referring to FIGS. 5A-5B, the adjustment component 504 may be configured to receive an input 502 from the device 510. In an example, the input 502 may correspond to a gesture 516 (represented by the bold arrow) performed on a touchscreen display 514 of the device 510, as illustrated by FIG. 5B. The adjustment component 504 may be configured to evaluate the gesture 516 to identify a hand orientation 506 utilized to perform the gesture 516. Notably, the adjustment component 504 may be configured to identify the orientation of any input object utilized by the user (e.g., arm orientation, leg orientation, etc.). In an example, the adjustment component 506 may be configured to evaluate one or more characteristic of the gesture 516, such as curvature 532, length 536, etc. to identify the hand orientation 506 of the user, as illustrated by FIG. 5C. The characteristic of the gesture 516 may be evaluated to identifying aspects of the hand orientation 506, such as a grip 538 utilized to hold the device 510, a finger length 534 of a thumb utilized to perform the gesture 516, etc.

Figure 5D:
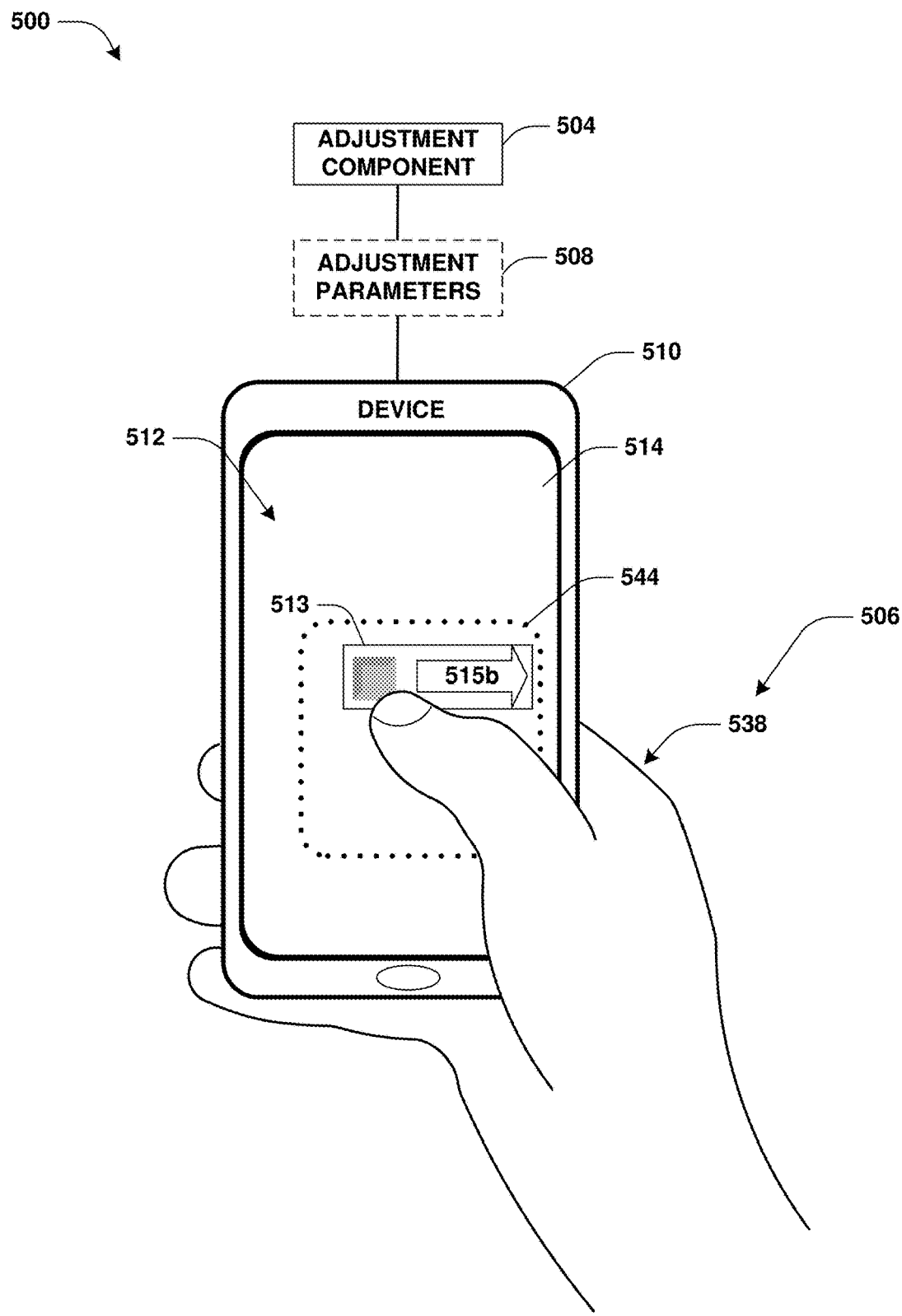
FIG. 5D is a component block diagram illustrating an example system for adjusting a user interface, wherein a user interface element is adjusted.

Responsive to identifying the hand orientation 506, the adjustment component 504 may be configured to adjust the user interface 512 displayed by the device 510. In an example, the adjustment component 504 may be configured to provide adjustment parameters 508 for the adjustment of the user interface 512, as illustrated in FIGS. 5A and 5D. The adjustment parameters 508 may provide instructions, which when executed may adjust the user interface 512. In an example, the adjustment parameters 508 may provide instructions for adjusting a location and a functionality of a slider user interface element 513 having a first sliding directionality 515a, as illustrated by FIGS. 5C and 5D (e.g., the direction a user swipes an unlock button may be adjusted). By way of example, the adjustment component 504 may identifying a primary accessibility area 544 based upon the aspects of the hand orientation and/or the characteristics of the gesture 516. The adjustment parameters 508 may provide instructions to relocate the slider user interface element 513 into the primary accessibility area 544 of the user interface 512. Still referring to FIGS. 5C and 5D, the adjustment parameters 508 may provide instructions to adjust the functionality of the slider user interface element 513, such as by adjusting the first sliding directionality 515a of the slider user interface element 513 to a second sliding directionality 515b. The first sliding directionality 515a may comprise a right-to-left sliding directionality, which may be preferred when a left hand orientation is identified (e.g., preferred by left handed users) and the second sliding directionality 515b may comprise a left-to-right sliding directionality, which may be preferred when a right hand orientation is identified (e.g., preferred by right handed users). In an example, adjusting the functionality and/or location of user interface elements within user interfaces may increase the efficiency with which users interact with the user interfaces and/or improve an overall user experience of the user with the user interfaces (e.g., the user may not have to change from one grip to another grip in order to interact with various user interface elements and/or user interface elements may be tailored to a manner in which the user utilizes a device, such as whether the user is left handed, right handed, or prefers a particular grip).

In an example, a training component 515 may be configured to receive feedback in response to the adjustment made to the user interface 512 by the adjustment component 504, as illustrated by FIG. 5A. The feedback may be utilized by the training component 515 to train the adjustment component 504. For example, responsive to the user interface 512 being adjusted for a left-handed orientation when the user is utilizing a right-handed orientation, the user may provide feedback to the training component 515 indicating the wrong orientation was identified. In this way, the adjustment component 504 may be trained by the training component 515 to subsequently identify the correct hand orientation for similar inputs received (e.g., the curvature for the gesture for which feedback was provided may be subsequently associated with the correct hand orientation based upon the feedback provided).

Figure 6A:
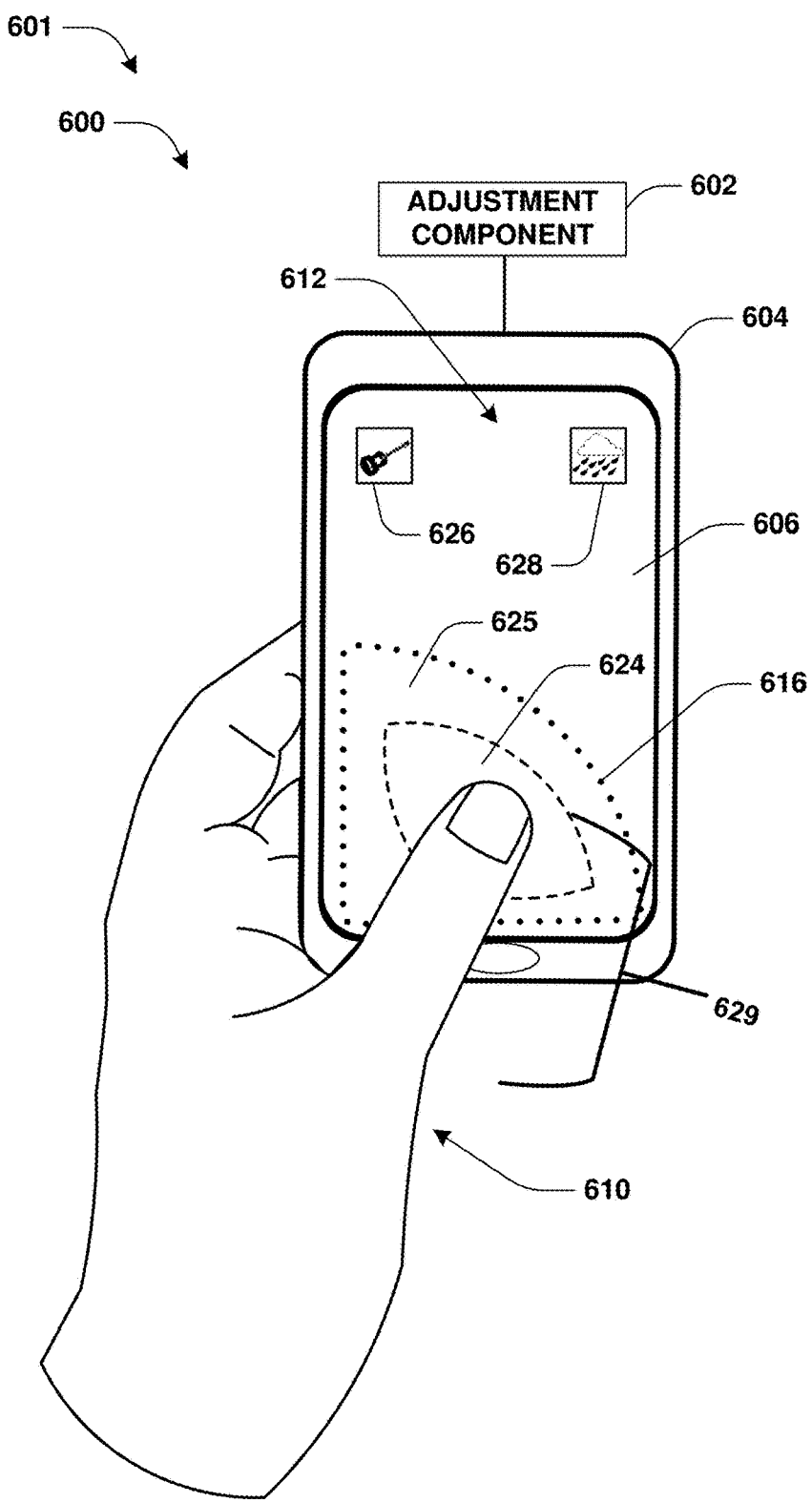
FIG. 6A is a component block diagram illustrating an example system for adjusting a user interface, wherein a primary accessibility area, a first sub-area, and second sub-area are identified.
Figure 6B:
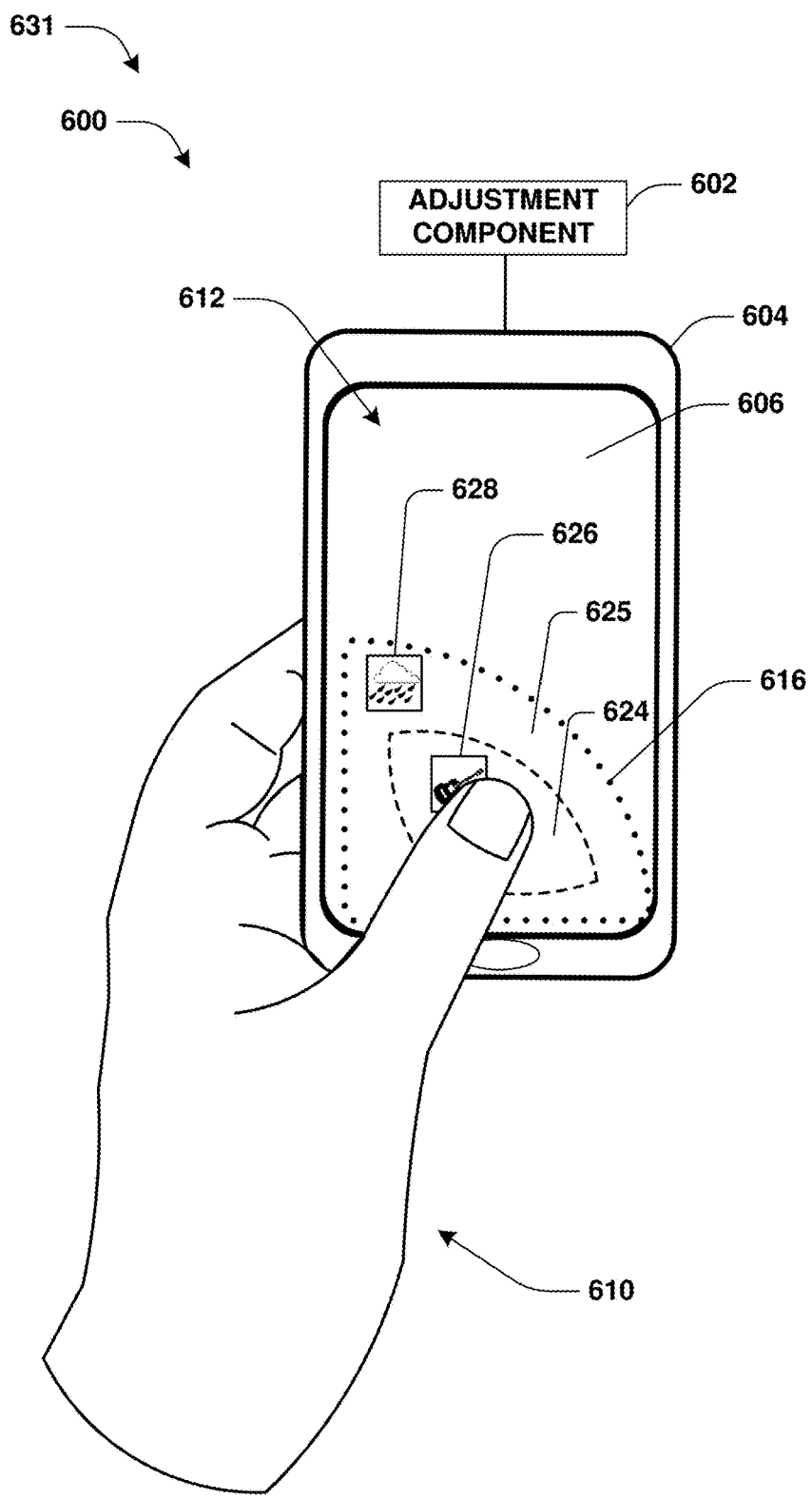
FIG. 6B is a component block diagram illustrating an example system for adjusting a user interface, wherein a first user interface element and a second user interface element are relocated within a user interface.

FIGS. 6A-6B illustrate examples of the system 600, where a user interface 612, displayed on a touchscreen display 606 of a mobile device 604, is adjusted based upon a hand orientation 610. The user interface 612 may be configured to display a musical application user interface element 626 and a weather application user interface element 628. FIG. 6A illustrates an example 601 where a primary accessibility area 616, comprising a first sub-area 624 and a second sub-area 625 (e.g., a portion of the primary accessibility area 616 not overlapping the first sub-area 624), is identified by an adjustment component 602. In an example, the primary accessibility area 616, the first sub-area 624, and/or the second sub-area 625 may be identified based upon the hand orientation 610 (e.g., grip) and/or a finger length size 629. The first sub-area 624 may have a greater level of access than the second sub-area 625 based upon an ability of the user to access the first sub-area 624 being greater than an ability of the user to access the second sub-area 625 (e.g., the user may have to bend his thumb and/or fully extend his thumb in order to access the second sub-area 625).

FIG. 6B illustrates an example 631 of the system 600 where the adjustment component 602 is configured to adjust the user interface 612 by relocating the musical application user interface element 626 and the weather application user interface element 628 into the primary accessibility area 616. In an example, responsive to the user utilizing the musical application user interface element 626 more frequently than the weather application user interface element 628, the musical application user interface element 626 may be relocated into the first sub-area 624 having the greater level of access, and the weather application user interface element 628 may be relocated into the second sub-area 625 having the lower level of access. In this way, user interface elements that are utilized more frequently by the user may be located within areas of the user interface 612 which are more easily accessible to the user.

Figure 7A:
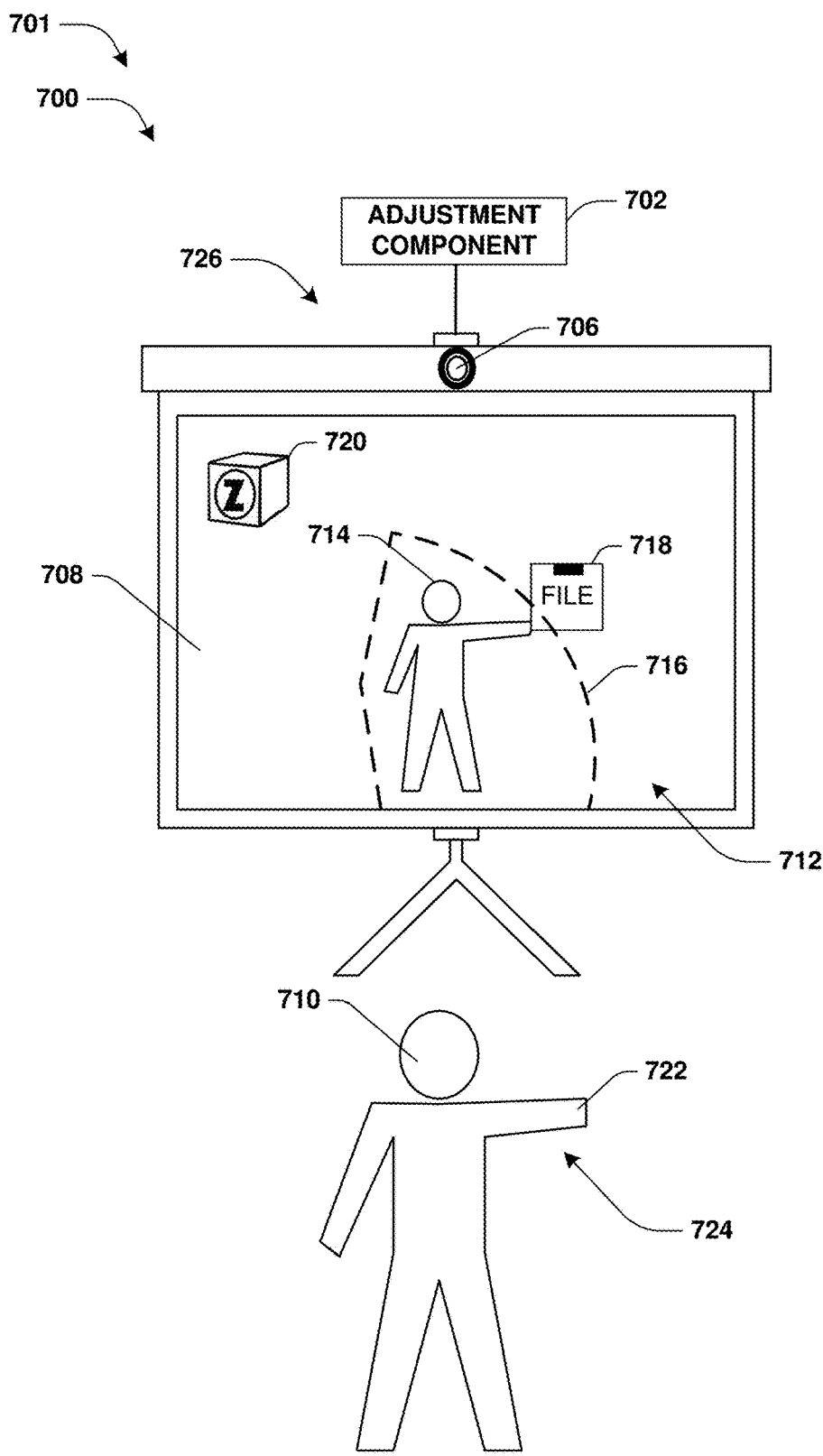
FIG. 7A is a component block diagram illustrating an example system for adjusting a user interface, wherein a user performs a gesture with an arm.
Figure 7B:
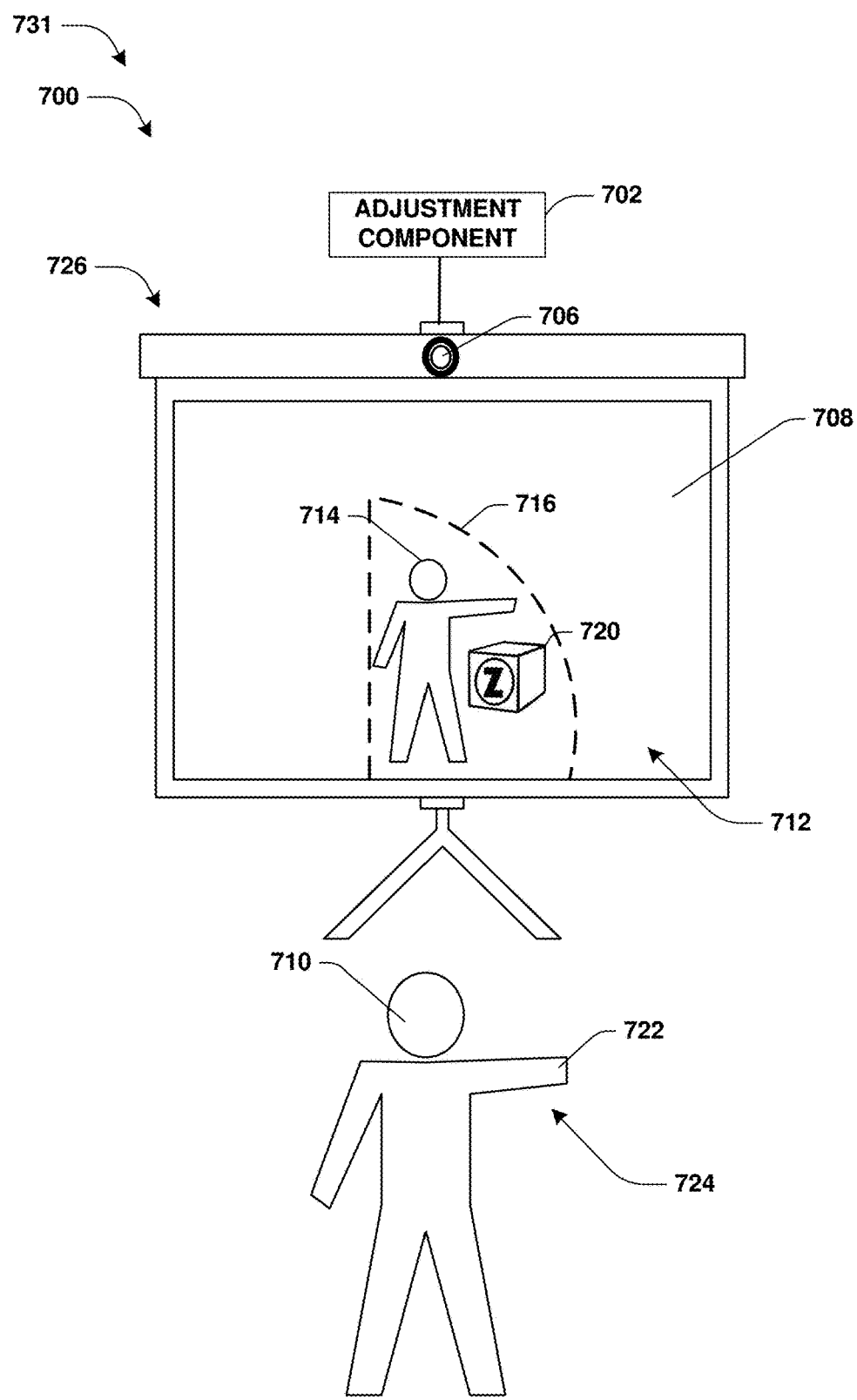
FIG. 7B is a component block diagram illustrating an example system for adjusting a user interface, wherein a user interface element displayed by a projection display is adjusted.

FIGS. 7A-7B illustrate examples of a system 700 for adjusting a user interface 712 displayed by a motion sensing display 708 of a device 726. In an example, a line-of-motion input sensor 706 may be utilized to project a virtual representation 714 of a user 710 onto the motion sensing display 708. One of ordinary skill in the art may appreciate that in some examples only a portion of the user 710 (e.g., an arm) may be projected on the motion sensing display 708 and/or no virtual representation 714 of the user 710 may be projected (e.g., the user 710 may gesture through the air towards the motion sensing display 708 to interact with a user interface element). In an example, the virtual representation 714 may be controlled via gestures performed by the user 710 relative to the motion sensing display 708 (e.g., the virtual representation 714 may mimic the movements of the user 710). Turning to FIG. 7A, example 702 illustrates the user 710 performing a push gesture with his right arm 722 to cause the virtual representation 714 to close an application associated with a first user interface element 718. In an example, the adjustment component 702 may evaluate the push gesture to determine an arm orientation preference 724 and/or a primary accessibility area 716. For example, the adjustment component 702 may evaluate the push gesture, a location of the user 710 relative to the motion sensing display 708, and/or a proportion of the user (e.g., arm length, height, etc.) to determine the primary accessibility area 716 and/or the arm orientation preference 724.

FIG. 7B illustrates an example 731 for adjusting a location of a second user interface element 720 based upon the arm orientation preference 724 and/or the primary accessibility area 716. In an example, the second user interface element 720 may be relocated to be within the primary accessibility area 716. In this way, the user 710 may utilize the virtual representation 714 to access the second user interface element 720 without the need to reposition himself relative to the projection display 708.

Figure 8A:
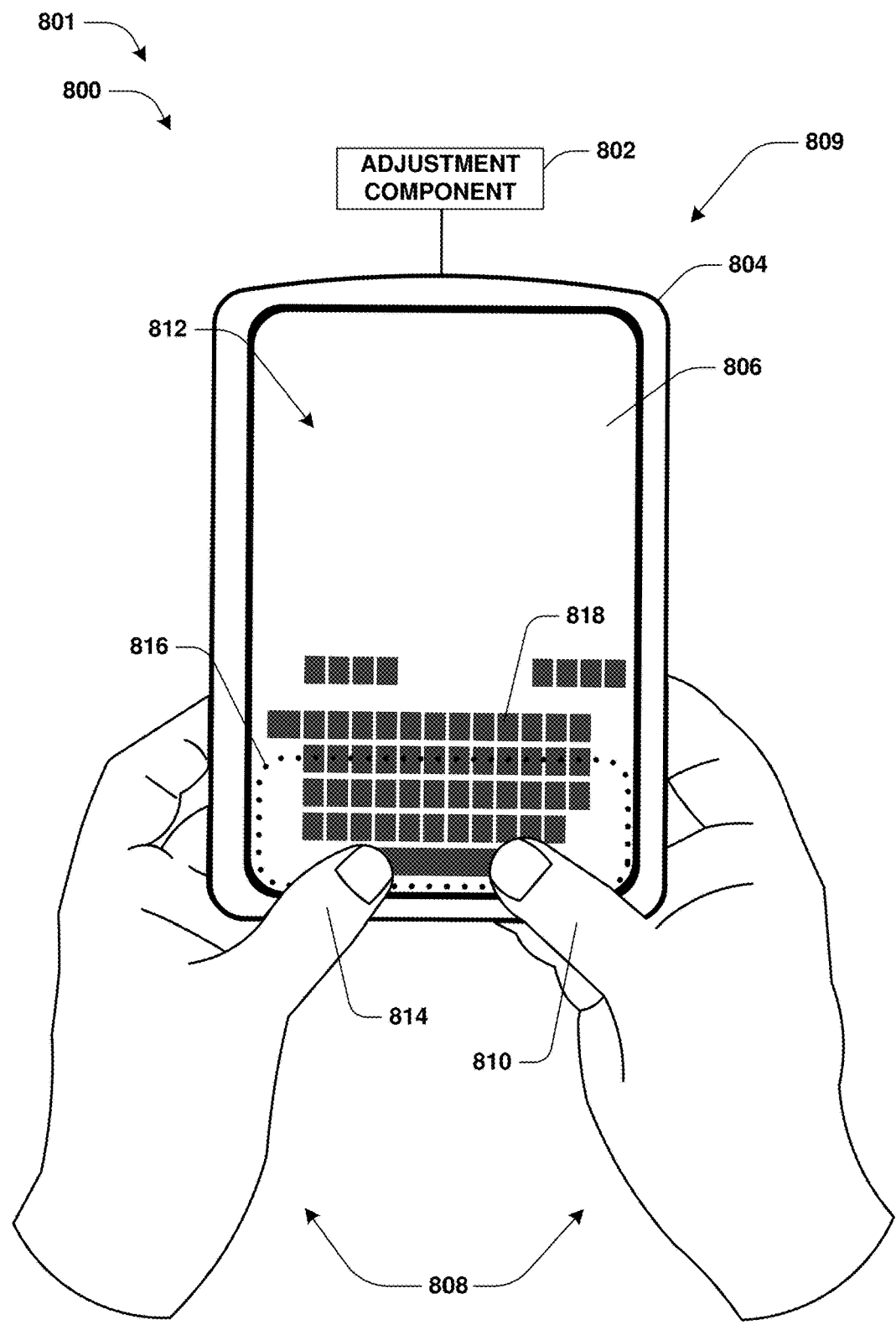
FIG. 8A is a component block diagram illustrating an example system for adjusting a user interface, wherein a tablet is in a portrait orientation.

FIGS. 8A-8D illustrate examples of adjusting a virtual keyboard user interface element 818 based upon a two handed orientation 808 utilized on a tablet 804. In an example, the two handed orientation 808 may be identified by the adjustment component 802 in response to a first gesture performed by a right thumb 810 and a second gesture performed by a left thumb 814, wherein the first gesture has right handed curvature and the second gesture has left handed curvature (not illustrated). FIG. 8A illustrates an example 801 of an adjustment component 802 configured to identify a primary accessibility area 816 of a user interface 812 for the two handed orientation 808, where the tablet 804 is in a portrait orientation 809. In an example, the adjustment component 802 may be configured to combine a first accessibility area (not illustrated) for a right thumb 810 and a second accessibility area (not illustrated) for a left thumb 814 to form the primary accessibility area 816 for the two handed orientation 808 (e.g., responsive to the first accessibility area overlapping the second accessibility area, one primary accessibility area may be identified). In an example, the primary accessibility area 816 may correspond to an area of the user interface 806 which is accessible to the user while utilizing the two handed orientation 808 (e.g., the area the user can reach using the right thumb 810 and the left thumb 814 without changing his grip on the tablet 804).

Figure 8B:
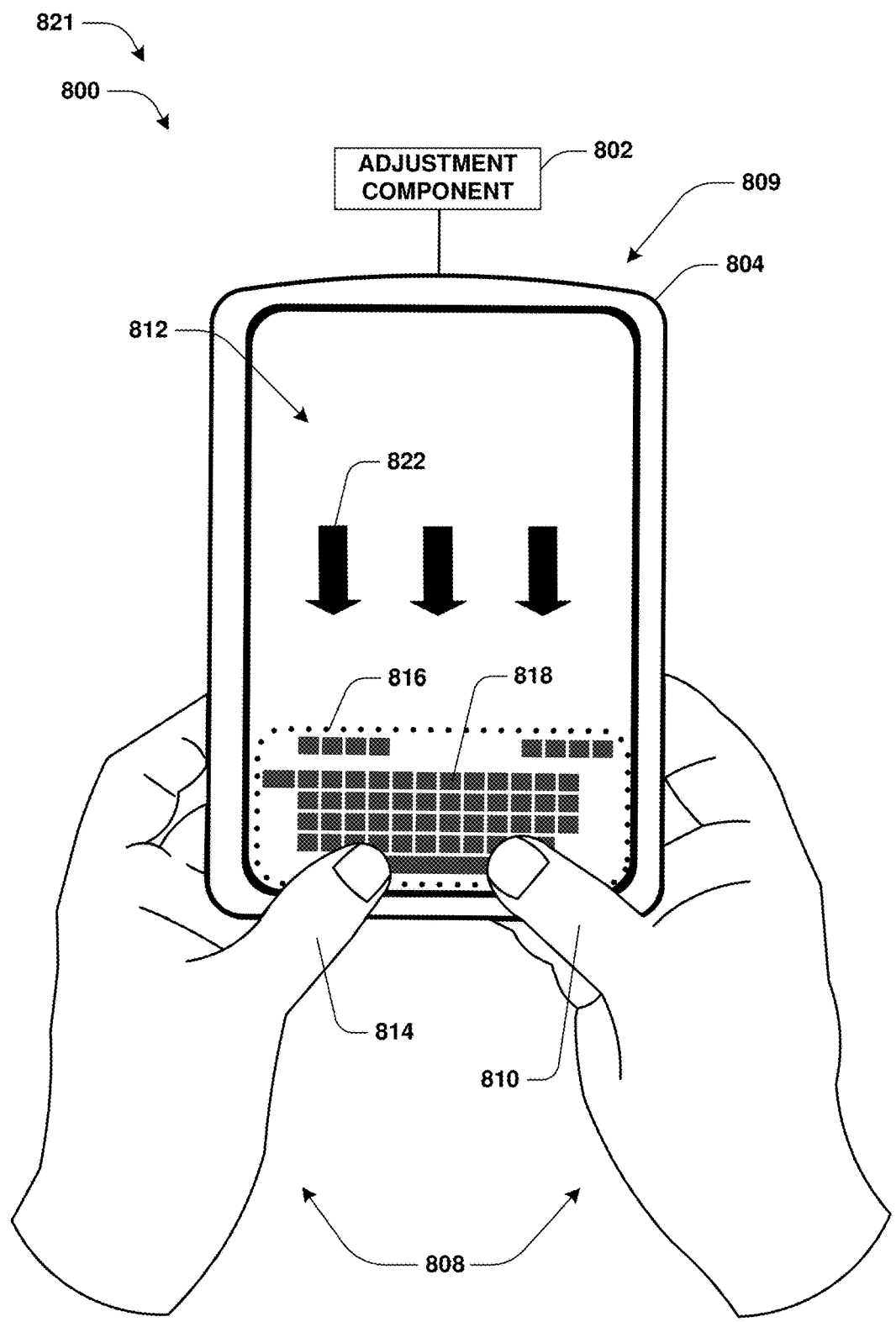
FIG. 8B is a component block diagram illustrating an example system for adjusting a user interface, wherein a virtual keyboard user interface element is adjusted based upon a primary accessibility area.

FIG. 8B illustrates an example 821 where the adjustment component 802 is configured to adjust the size of the virtual keyboard user interface element 818 based upon the primary accessibility area 816. For example, the adjustment component 802 may perform a reducing function 822 on the virtual keyboard user interface element 818. The reducing function 822 may adjust the size of the virtual keyboard user interface element 818, such that the virtual keyboard user interface element 818 is completely and/or substantially within the primary accessibility area 816 (e.g., if reducing the size of the virtual keyboard user interface element 818 to fit completely within the primary accessibility area 816 reduces the usability of the virtual keyboard user interface element 818, then the size of the virtual keyboard user interface element 818 may be reduced to a size wherein at least an increased amount of the virtual keyboard user interface element 818 fits within the primary accessibility area 816 without reducing the usability of the virtual keyboard user interface element 818).

Figure 8C:
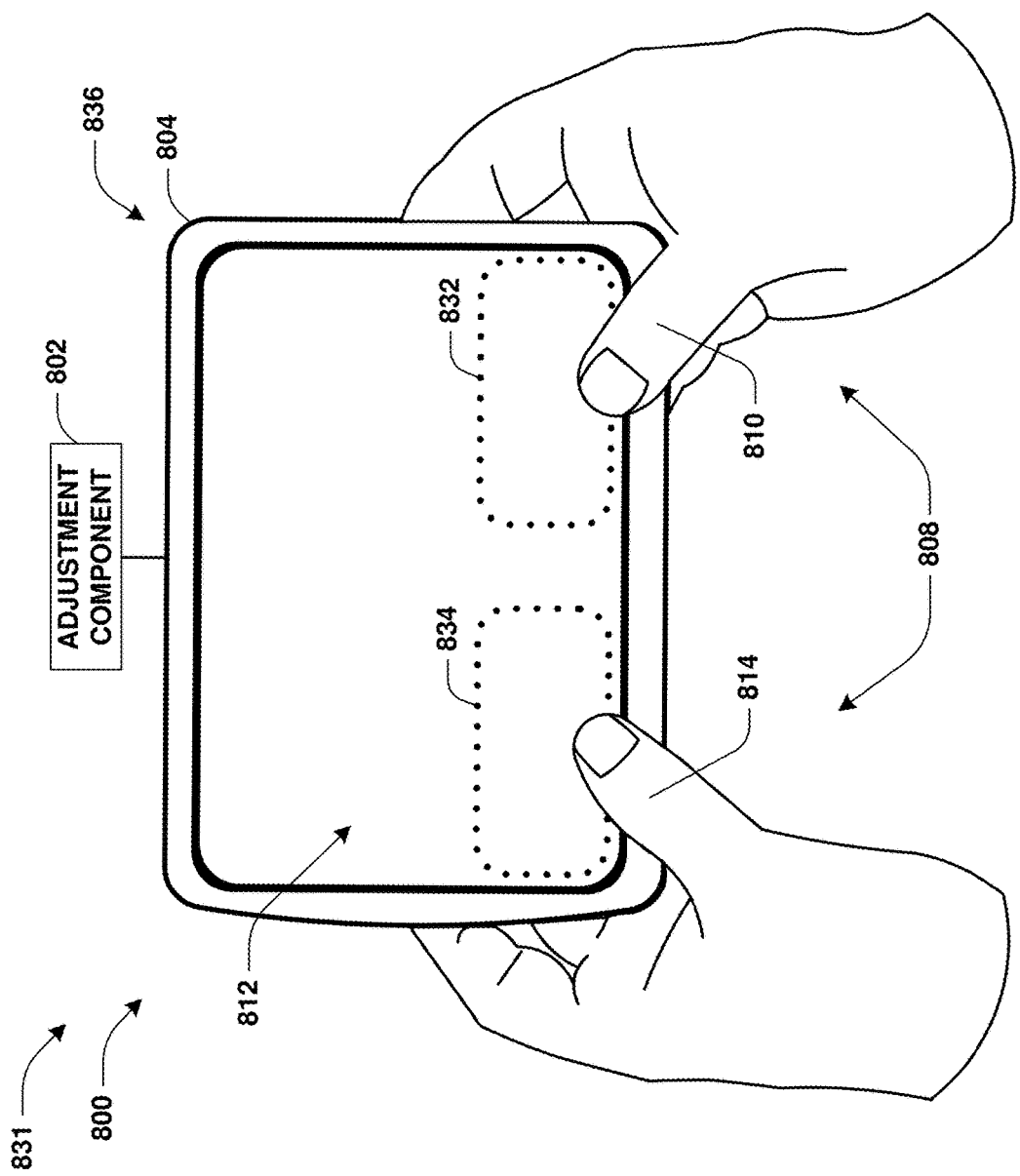
FIG. 8C is a component block diagram illustrating an example system for adjusting a user interface, wherein a tablet is in a landscape orientation.

FIG. 8C illustrates an example 831 of the adjustment component 802 identifying a right-hand primary accessibility area 832 and a left hand primary accessibility area 834 for the two handed orientation 808, wherein the tablet 804 is in a landscape orientation 836. The adjustment component 802 may be configured to identify the right-hand primary accessibility area 832 based upon the first gesture performed by the right thumb 810 and the left-hand primary accessibility area 834 based upon the second gesture performed by the left thumb 814. In another example, the right-hand primary accessibility area 832 and/or the left-hand primary accessibility area 834 may be determined based upon the tablet 804 being held in the landscape orientation 836 and known characteristics from previously evaluated gestures (e.g., a gesture performed by the right thumb 810 with a similar hand orientation may be utilized to determine a primary accessibility area for the left thumb 814 based upon the size of the user's left thumb 814 being comparable to the size of the user's right thumb 810, etc.).

FIG. 8D illustrates an example 841 where the adjustment component 802 is configured to adjust a functionality, a size, and/or a layout of the virtual keyboard user interface element 818 in response to the tablet 804 being in the landscape orientation 836. In an example, a layout of the virtual keyboard user interface element 818 may be adjusted to a split keyboard layout having a right keyboard portion 848*a* and a left keyboard portion 848*b* based upon the right-hand primary accessibility area 832 and the left-hand primary accessibility area 834 being spaced apart. For example, the right keyboard portion 848*a* may be configured to fit within the right-hand primary accessibility area 832 and a left keyboard portion 848*b* may be configured to fit within the left-hand primary accessibility area 834. In an example, adjusting the layout of the virtual keyboard user interface element 818 may increase the efficiency with which users interact (e.g., types) with user interfaces in various orientations (e.g., portrait, landscape, etc.).

Figure 9:
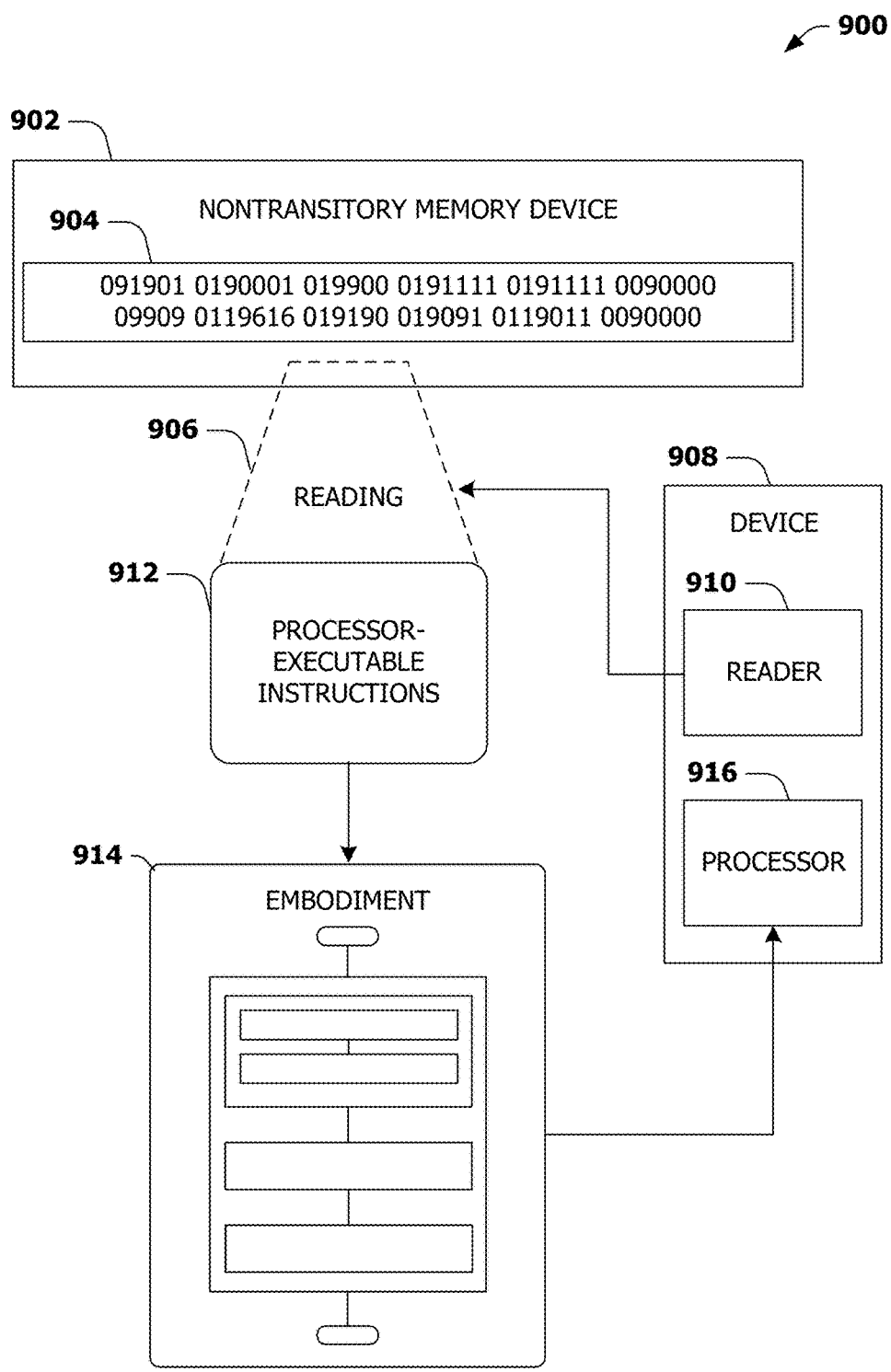
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 400 of FIG. 4, for example. In some embodiments, the processor-executable instructions, when executed on the processor 916 of the device 908, are configured to implement a system, such as at least some of the example system 500 of FIGS. 5A-5D, at least some of the example system 600 of FIGS. 6A-6B, at least some of the example system 700 of FIGS. 7A-7B, and/or at least some of the example system 800 of FIGS. 8A-8D, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for adjusting a user interface based upon an orientation of an input object associated with a user, comprising:

receiving an input, provided by an input object associated with a user, for a device while the device is held by the input object associated with the user with a first grip;

evaluating the input to determine a touch gesture, comprising a swipe gesture or a pan gesture, relative to a display of the device;

evaluating the touch gesture, comprising the swipe gesture or the pan gesture, to determine an orientation of the input object and a finger length of a finger of the input object;

identifying, based upon the orientation of the input object and the finger length of the finger of the input object, a primary accessibility area, associated with the first grip, corresponding to a reachable area of the display of the device that is reachable to at least part of the input object associated with the user while the input object associated with the user holds the device with the first grip, wherein the primary accessibility area is defined by at least one curved boundary, wherein the at least one curved boundary corresponds to a distance that the finger of the input object is determined to be able to access while the input object associated with the user holds the device with the first grip, wherein the identifying the primary accessibility area comprises (i) identifying a first sub-area, of the primary accessibility area, that is defined at least in part by the at least one curved boundary and (ii) identifying a second sub-area, of the primary accessibility area, that does not overlap the first sub-area and that is defined at least in part by a second curved boundary different than the at least one curved boundary; and adjusting a user interface displayed by the device based upon the primary accessibility area, wherein the adjusting comprises adjusting the user interface to display a first user interface element in the first sub-area based upon a first rate of interaction associated with the first user interface element and display a second user interface element in the second sub-area based upon a second rate of interaction associated with the second user interface element.

2. The method of claim 1, wherein the display comprises: a touchscreen display or a motion sensing display.

3. The method of claim 2, wherein the input comprises gesture data corresponding to a gesture performed by the user relative to the touchscreen display or the motion sensing display.

4. The method of claim 3, the gesture comprising at least one of:
a single touch gesture, a multi-touch gesture, or a hands-off gesture.

5. The method of claim 3, the evaluating the input comprising:
evaluating curvature associated with the gesture to determine the orientation of the input object.

6. The method of claim 3, the input object comprising a hand of the user, and the evaluating the input comprising:
evaluating the gesture to identifying at least one of a right focused curvature or a left focused curvature;
responsive to identifying the right focused curvature, determining that the user has a right hand orientation;
responsive to identifying the left focused curvature, determining that the user has a left hand orientation; and
adjusting the user interface based upon the user having either the right hand orientation or the left hand orientation.

7. The method of claim 1, comprising:
evaluating the input to determine a hand size of the user; and
adjusting the user interface based upon the hand size of the user.

8. The method of claim 1, the adjusting the user interface comprising:
adjusting at least one of a location, a size, an appearance, an output, or a functionality of a user interface element displayed within the user interface.

9. The method of claim 8, the adjusting the functionality of the user interface element comprising at least one of:
adjusting a directionality of the user interface element;
adjusting a sound associated with the user interface element;
adjusting a notification type associated with the user interface element; or adjusting a type of content displayed by the user interface element.

10. The method of claim 1, wherein the primary accessibility area comprises a first region of a touchscreen display that is a first distance away from a corner of the touchscreen display, wherein the first distance corresponds to at least half of a height of the touchscreen display, wherein the primary accessibility area comprises a second region of the touchscreen display that is a second distance away from the corner of the touchscreen display, wherein the second distance corresponds to at least half of a width of the touchscreen display.

11. The method of claim 10, wherein the first distance is equal to the second distance.

12. The method of claim 1, the first sub-area having a first level of access and the second sub-area having a second level of access, the first level of access greater than the second level of access.

13. The method of claim 1, comprising:
evaluating the input to determine an emotional state of the user; and
adjusting the user interface based upon the emotional state of the user and the orientation of the input object.

14. The method of claim 13, the input corresponding to a gesture performed by the user, and the evaluating the input comprising:
evaluating a force of the gesture to determine the emotional state of the user.

15. The method of claim 1, the input comprising gesture data corresponding to a gesture performed by the user, and the method comprising:
generating calibration data for a particular orientation of the input object,
the evaluating the touch gesture comprising:
comparing the calibration data for the particular orientation to the gesture data; and
responsive to the calibration data corresponding to the gesture data, determining that the orientation of the input object corresponds to the particular orientation.

16. The method of claim 15, the generating calibration data comprising:
instructing the user to hold the device with a particular grip;
instructing the user to perform a calibration gesture utilizing the particular grip to generate the calibration data; and
evaluating the calibration data to determine curvature associated with the calibration gesture.

17. A system for adjusting a user interface based upon a hand orientation of a user, comprising:
a processor; and
memory comprising processor-executable instructions that when executed by the processor cause implementation of an adjustment component configured to:
receive an input from a user through a display of a device, the input corresponding to a gesture performed by the user while the device is held by a hand of the user with a first grip;
evaluate curvature of the gesture to determine a hand orientation of the user and a finger length of a finger of the hand;
identify, based upon the hand orientation of the user and the finger length of the finger of the hand, a primary accessibility area for a user interface associated with the first grip, wherein the primary accessibility area corresponds to a reachable area of the display of the device that is reachable to at least part of the hand of the user while the hand of the user holds the device with the first grip, wherein the identifying the primary accessibility area comprises (i) identifying a first sub-area, of the primary accessibility area, that is defined at least in part by the at least one curved boundary and (ii) identifying a second sub-area, of the primary accessibility area, that is defined at least in part by a second curved boundary different than the at least one curved boundary; and adjust the user interface, based upon the hand orientation of the user and the primary accessibility area, wherein the adjusting comprises adjusting the user interface to display a first user interface element in the first sub-area based upon a first rate of interaction associated with the first user interface element and display a second user interface element in the second sub-area based upon a second rate of interaction associated with the second user interface element.

18. The system of claim 17, the instructions, when executed by the processor, causing implementation of:

a training component configured to:

receive feedback from the user corresponding to the adjustment of the user interface; and responsive to the feedback indicating an incorrect orientation was identified, train the adjustment component based upon the feedback from the user.

19. A non-transitory computer readable medium comprising computer executable instructions that when executed by a processor perform a method for adjusting a user interface, comprising:

receiving an input from a user through a touchscreen display of a device, the input comprising gesture data corresponding to a gesture performed on the touchscreen display while the device is held by a hand of the user with a first grip;

evaluating the gesture data to determine a hand orientation and a finger length of a finger of the hand;

identifying a primary accessibility area, associated with the first grip, for a user interface displayed by the touchscreen display based upon the hand orientation and the finger length of the finger of the hand, wherein the primary accessibility area corresponds to a reachable area of the touchscreen display of the device that is reachable to at least part of the hand of the user while the hand of the user holds the device with the first grip, wherein the identifying the primary accessibility area comprises (i) identifying a first sub-area, of the primary accessibility area, that is defined at least in part by at least one curved boundary and (ii) identifying a second sub-area, of the primary accessibility area, that is defined at least in part by a second curved boundary different than the at least one curved boundary; and adjusting a user interface element within the user interface based upon the hand orientation of the user and the primary accessibility area of the user interface, wherein the adjusting comprises adjusting the user interface to display a first user interface element in the first sub-area based upon a first rate of interaction associated with the first user interface element.

20. The non-transitory computer readable medium of claim 19, the evaluating the gesture data comprising:

evaluating curvature associated with the gesture to determine the hand orientation of the user.

\* \* \* \* \*